United States Patent [19]

Scott

[11] Patent Number: 4,916,750
[45] Date of Patent: Apr. 10, 1990

[54] SEALED DOUBLE ROW SPHERICAL ROLLER BEARING

[75] Inventor: James W. Scott, Burlington, Canada

[73] Assignee: NTN Toyo Bearing Co. Ltd., Osaka, Japan

[21] Appl. No.: 289,003

[22] Filed: Dec. 23, 1988

[51] Int. Cl.$^4$ ............................................. F16C 33/78
[52] U.S. Cl. ..................................... 384/484; 384/558
[58] Field of Search ............... 384/484, 558, 585, 903, 384/539

[56] References Cited

U.S. PATENT DOCUMENTS

| | | | |
|---|---|---|---|
| 2,967,743 | 1/1961 | Howe | 384/484 |
| 3,187,591 | 6/1965 | Johnson | 384/558 |
| 3,603,655 | 9/1971 | Keller | 384/484 |
| 3,981,550 | 9/1976 | Zimmer et al. | 384/558 |
| 4,373,760 | 2/1983 | Durham | 384/585 |
| 4,755,067 | 7/1988 | Asberg et al. | 384/482 |
| 4,790,543 | 12/1988 | Wittmeyer | 277/25 |

Primary Examiner—Lenard A. Footland

[57] ABSTRACT

A sealed double row spherical roller bearing assembly, having a bearing, with an outer race providing two spaced-apart outer roller tracks, and defining in section an arc of a sphere, an inner race defining two parallel spaced-apart inner roller tracks, each defining in section an arc of a sphere, a plurality of rollers located in respective inner and outer tracks, each of the rollers defining in section an arc of a sphere corresponding to the arcs of respective inner and outer tracks, seal retaining shoulders formed on one race, seal engaging surfaces formed on the other race, two annular flexible seals supported on respective seal retaining shoulders, and extending into engagement with respective seal engaging surfaces, and a bearing housing receiving the bearing, the housing being open at both ends.

Also disclosed is a bearing housing having retaining means for retaining a bearing in at least two positions.

10 Claims, 4 Drawing Sheets

SEALED DOUBLE ROW SPHERICAL ROLLER BEARING

The invention relates to double row spherical roller bearings and in particular to such a bearing which is greased and "sealed for life", and is mounted in a housing.

BACKGROUND OF THE INVENTION

Spherical roller bearings have the property that they will accomodate a certain degree of shaft misalignment. The inner race is capable of turning to a certain degree relative to the outer race. This action is not possible in other forms of roller bearing.

Roller bearings require lubrication. In many forms of roller bearing however, during operation the lubrication deteriorates and becomes dissipated. For these reasons such bearings must be re-lubricated at regular intervals.

To reduce the requirement for re-lubrication, and to exclude foreign matter, bearings may be sealed in various ways.

In the case of standard sealed roller bearings, in some cases, seals were placed between the inner and the outer race, so that the rollers are entirely enclosed. Examples are shown in U.S. Pat. Nos. 4,575,265, and 3,773,397. In most cases however, seals were mounted in the bearing housing and sealed directly on the shaft.

The use of a sealed bearing housing causes certain difficulties in replacing the bearing.

In the typical bearing housing, the housing is in two parts. The bearing is received in a recess in the bearing base, and a bearing cap is then bolted over the top of the bearing holding it in place.

The shaft is secured in the bearing by a split, tapered sleeve with a lock nut threaded on the smaller end. The sleeve and nut are located within the bearing.

If it is required to replace the bearing, then it is necessary to remove the housing cap, disconnect the shaft and raise it to a sufficient height that the sleeve and nut can be loosened and the bearing can be slid along the shaft clear of the lower part of the housing.

This is inconvenient and causes costly down time of machinery.

Since most bearings are installed in pairs, two to a shaft, it is apparent that both bearing housings must be opened to achieve this.

In the case of double row spherical roller sealed bearings, this situation was unsatisfactory for other reasons. Since spherical roller bearings are often used where some degree of shaft misalignment must be expected, the shaft misalignment impaired the effectiveness of the seals. Since the seals bore directly on the shaft itself, any deflection of the shaft would impair the seal. In addition, the provision of such seals in the bearing housing caused some additional expense.

Bearing housings of a one piece construction are known. In these bearing housings, the bearings are held in a one piece housing by means of circlips or the like.

Bearing housings of this type have an advantage over the typical two part housing. In this type of housing, if it is desired to replace the bearing, then the housings are simply unbolted from the base structure, and the shaft and both bearings moved to a bench. The sleeve and nut are loosened since they are accessible from outside the housing, and the bearing and housing can be slid along the shaft. Replacement of the bearing can therefore take place without the necessity of removing the bearing from the housing. The replacement unit will typically be a complete bearing and housing.

However, this type of one piece bearing housing does not lend itself to the provision of seals mounted in the housing and riding on the shaft itself.

Some proposals have been made for locating seals between the inner and outer races of single row spherical roller bearings. Such bearings are distinct from double row spherical roller bearings. Single row spherical roller bearings are incapable of withstanding axial thrust loads. Examples of such single row spherical roller bearings are shown in U.S. Pat. Nos. 3,306,687, 3,748,003 and 3,361,497. The seals used in these patents would not be adaptable to double row spherical roller bearings.

U.S. Pat. No. 3,667,821 shows a double row spherical roller bearing with a seal on one side of the races but no seal on the other. This would not provide a "sealed for life" double row spherical roller bearing.

U.S. Pat. No. 4,671,682 also shows a double row spherical roller bearing with seals. In this case, the seals are located between what is described as an axle box enclosing the outer race, and a flange on the inner race.

Neither patent discloses a seal located between the inner and outer races of a double row spherical roller bearing.

For all of these reasons therefore it is considered desirable to provide a double row spherical roller bearing which is sealed for life, and in which the seals are unaffected by misalignment, and which is mounted in a one piece bearing housing open at both ends giving access to the split sleeve and nut by which the bearing is secured on the shaft.

BRIEF SUMMARY OF THE INVENTION

With a view to overcoming the various problems noted above, the invention comprises a double row spherical roller bearing assembly comprising a bearing having an outer race, providing two spaced-apart outer roller tracks, and defining in section an arc of a sphere, an inner race defining two parallel spaced-apart inner roller tracks, each said track in turn defining in section an arc of a sphere, a plurality of rollers located in respective said inner and outer tracks each of said rollers defining, in section an arc of a sphere corresponding to said arcs of respective said inner and outer tracks, two right angular seal retaining shoulders formed on respective ends of said outer race, two seal engaging surfaces formed on respective ends of said inner race and registering with said right angular seal retaining shoulders, two metallic lubricant reservoir rings, and two annular flexible seal members mounted on respective said rings, and extending into engagement with respective said seal engaging surfaces on said inner race and a bearing housing receiving said bearing, said housing being open at both ends for free access.

It is a further and related objective of the invention to provide a sealed double row spherical roller bearing assembly of the type described wherein the seal engaging surfaces on said inner race are formed around an arc of a sphere.

It is a further and related objective of the invention to provide a sealed double row spherical roller bearing assembly wherein the two inner roller tracks are of generally channel-shaped cross-section, having respective side walls meeting said arcuate tracks at corners.

It is a further and related objective of the invention to provide a sealed double row spherical roller bearing assembly wherein the outer surface of the outer race is generally cylindirical, and, wherein along a marginal area of each end of said outer cylindrical surfaces, adjacent each end of said outer race, a bevelled lead portion is provided.

It is a further and related objective of the invention to provide a sealed double row spherical roller bearing assembly wherein each said resilient sealing ring is adapted to flex outwardly with respect to said bearing, whereby to permit release of any surplus lubricant.

It is a further and related objective of the invention to provide a double row spherical roller bearing assembly wherein said bearing is received in a generally cylindrical through-bore through said housing, and said housing defines three or more annular retention grooves in spaced relation to one another, adapted to receive retention devices, whereby said bearing can be held in at least two different axial positions, within said housing.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

Figure 1:
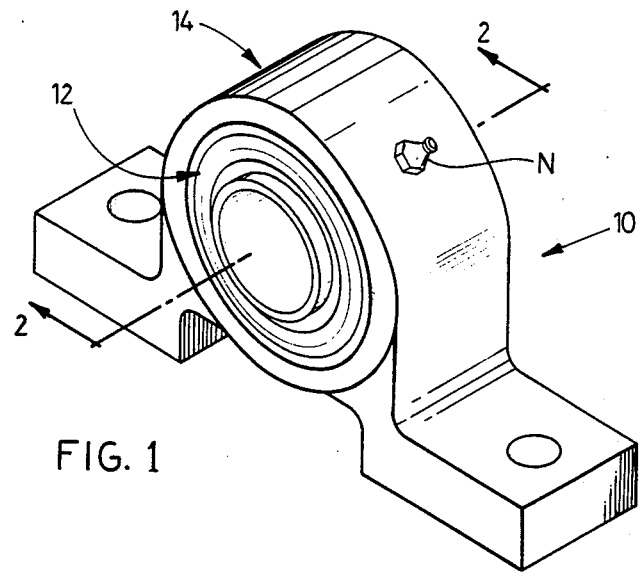
FIG. 1 is a perspective illustration of a double row spherical bearing assembly in accordance with the invention.
Figure 2:
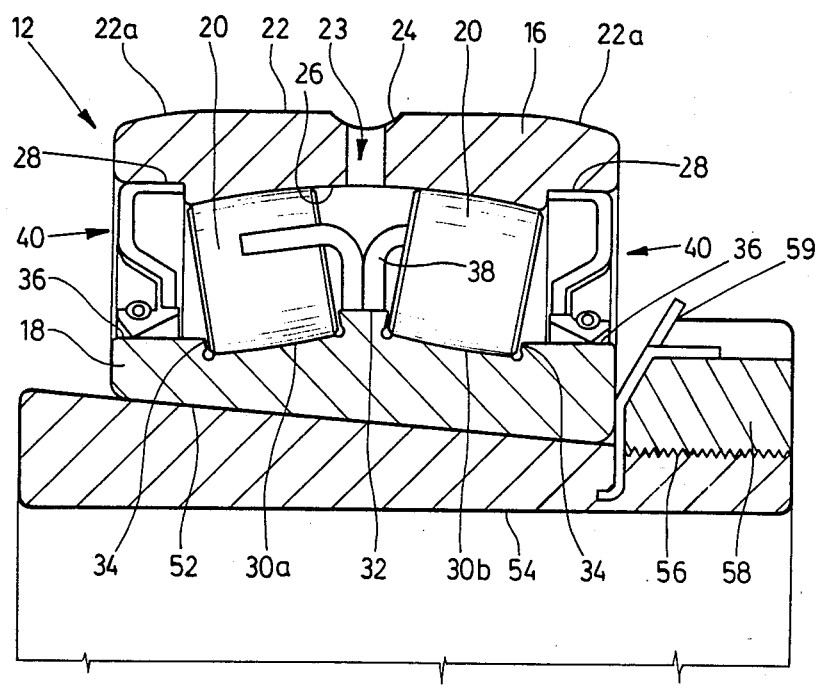
FIG. 2 is a sectional elevation through a portion of a double row spherical roller bearing in accordance with the invention.

Referring now to FIGS. 1 and 2, the bearing assembly is illustrated generally as 10. It will be seen to comprise a double row spherical roller bearing 12 and a one-piece housing 14 having a grease nipple N. The bearing 12 comprises an outer race 16, and an inner race 18, and a plurality of rollers 20.

The outer race 16 has a generally cylindrical outer wall 22, which at both ends of the bearing, is provided with a bevelled or angled "lead" portion 22a. A lubrication opening 23 is also shown provided, connecting with a lubrication channel 24.

On the inward side of the outer race 16, there is formed a continuous arcuate surface 26, providing two spaced-apart bearing tracks. These bearing tracks remain unreferenced, since in fact the entire arcuate surface 26 can in theory be regarded as one continuous bearing track, since it is one continuous arc of a sphere.

The outer race also defines a seal retaining shoulders 28—28 around either side or end of the bearing. These shoulders are of generally right angular L-shaped construction as shown, and extend outwardly from the arcuate track 26.

The inner race 18 on its inwardly directed surfaces defines two distinct spaced apart bearing tracks indicated as 30a and 30b. Both of tracks 30a-b define arcuate curves, corresponding to the radius of the arcuate curve of track 26 of the outer race. A continuous rib 32 separates the two tracks 30a-b, and edge walls 34—34 define the outer limits of the two tracks 30a-b.

It will thus be seen that the tracks 30a-b together with the rib 32 and the edge walls 34—34 define two spaced apart generally channel shaped formations.

Seal engaging surfaces 36—36 are formed on inner race 18, extending outwardly away from edge walls 34 for reasons to be described.

The rollers 20, are all formed with outer surfaces which define in section a smooth arc, corresponding to the radius of the spherical arcuate surfaces of the tracks 26 and 30a-b.

The rollers 20 are separated from one another by the usual form of cage device 38.

Figure 3:
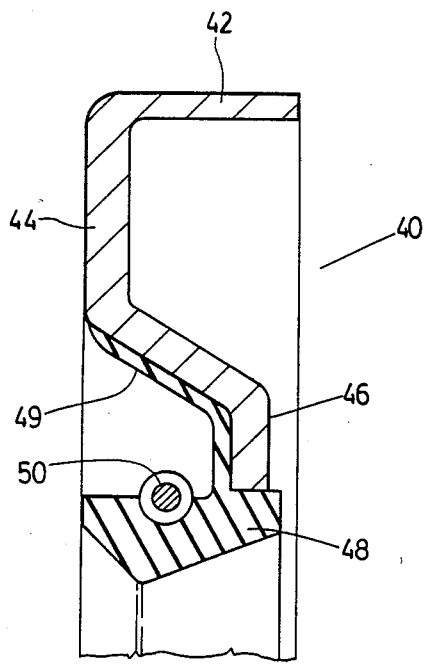
FIG. 3 is a greatly enlarged section showing the seal portion of the invention in greater detail.

In order to retain lubricant within the bearing, and to exclude foreign matter, seals are provided, which comprise the generally C-shaped reservoir rings 40—40. As shown in more detail in FIG. 3, each of the reservoir rings 40 comprise a retaining outer wall 42, an angled closure wall 44, and a mounting leg portion 46. The reservoir rings 40 make a friction fit within the cylindrical retaining shoulders 28 of the outer race.

On the mounting leg 46, there is provided a generally resilient sealing ring 48, having a spring ring 50, to retain the sealing ring 48 on the seal engaging surface 36 of the inner race 18.

Integral web 49 bonds the sealing ring 48 to mounting leg 46 and closure wall 44. Ring 48 can flex to some small degree to and fro. This ability to flex, both permits the venting of surplus lubricant and also permits the seal to accommodate some degree of shaft misalignment, without losing its sealing action.

In order to mount the bearing 12 on a shaft indicated generally as S, various means may be provided. However, in this embodiment of the invention the preferred method is to provide the inner race 18 with a tapered inner bore 52, and to provide a tapered split sleeve 54, threaded at its smaller end as at 56 adapted to fit within the tapered bore 52.

A nut 58 is adapted to be screwed on to the threads 56. This action will then draw the tapered sleeve 54 through the tapered bore 52. The sleeve 54 is split and will thus close on to the shaft S and firmly engage it. Lock washer 59 secures nut 58 in position.

In the event the shaft S exhibits a small degree of misalignment, then it will be apparent that the inner race can follow the misalignment of the shaft S, without disturbing the outer race 16. All that will happen is that the rollers 20 in the two rows will be displaced slightly along the arcuate surface 26 of the outer race 16 in one direction or the other. In some situations shaft misalignment may be in the region of up to as much as 1 to 1½ degrees.

When such shaft misalignment occurs, the sealing rings 48 can readily accommodate the amount of movement involved, by simply flexing relative to the enclosure rings 40.

Figure 4:
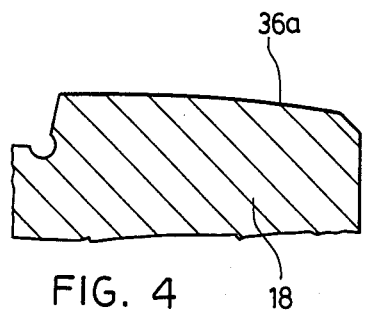
FIG. 4 is a sectional illustration of the inner race, corresponding to FIG. 2, showing an alternate embodiment.

In accordance with a further embodiment of the invention as illustrated in FIG. 4, the seal engaging surfaces 36—36 on the inner race may be formed around an arc indicated generally as 36A.

In the event of shaft misalignment, using this embodiment, the sealing rings 48 will thus follow around the arc without, in fact, being significantly displaced.

Figure 7:
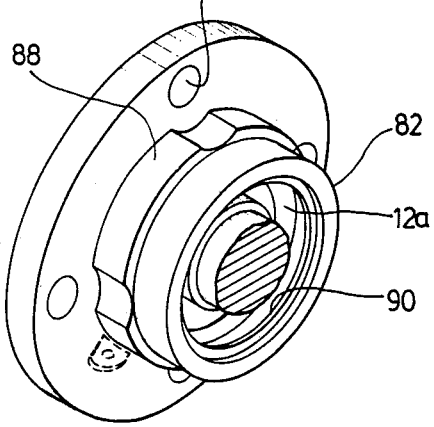
FIG. 7 shows a perspective of an alternate form of bearing housing.
Figure 5:
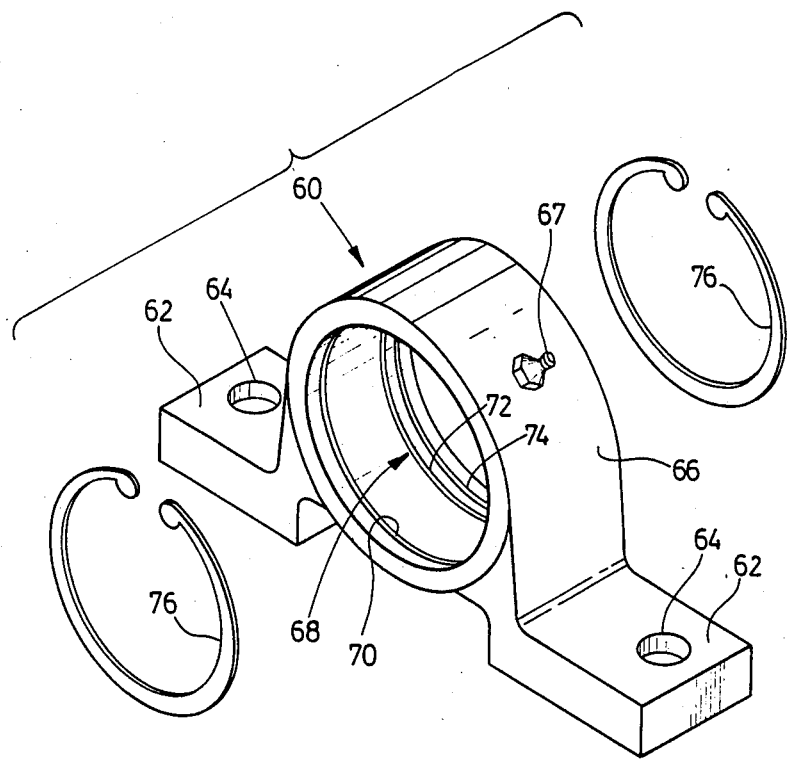
FIG. 5 is a perspective illustration of the bearing housing of FIG. 1 shown exploded.
Figure 6:
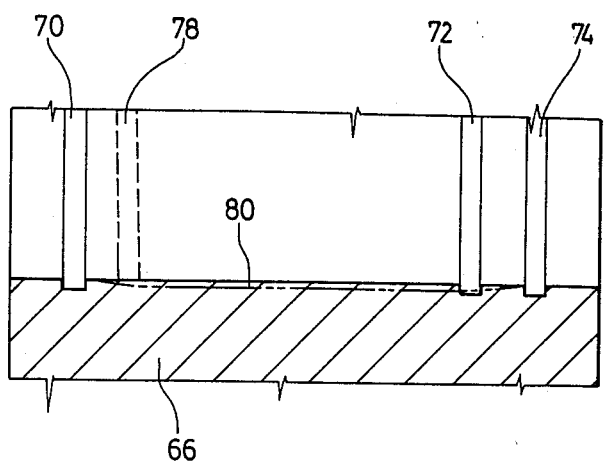
FIG. 6 is an enlarged section corresponding to FIG. 5, showing only a portion of the bearing housing, after certain conditions of heavy use.
Figure 8:
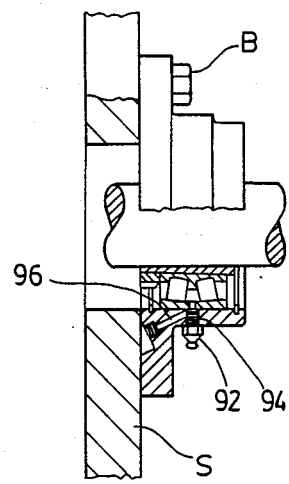
FIG. 8 shows a side elevation partly in section, showing the housing in one position; and, FIG. 9 is similar to FIG. 8, showing the housing in another position.
Figure 9:
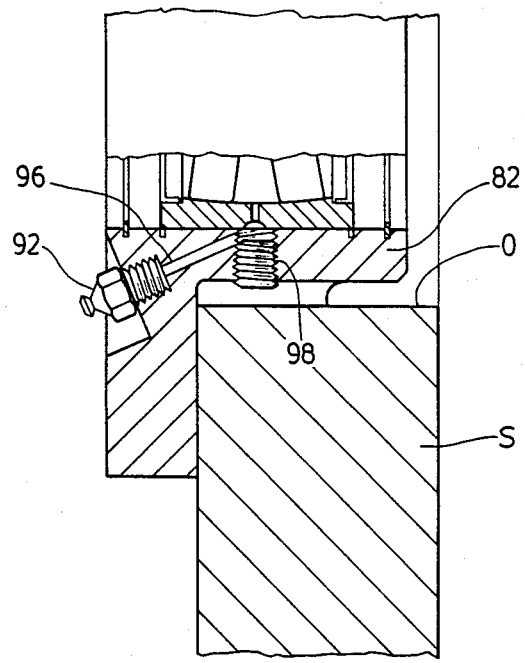

While bearings, as described and illustrated in FIGS. 1, 2, 3, and 4, may be used in a variety of different bearing housings, particularly advantageous forms of housing are illustrated in FIGS. 5 and 6 and in FIGS. 7, 8, and 9. Referring first of all to FIG. 5, the housing is illustrated generally as 60. It will be seen to be of the type of housing known as a "pillow block" housing. As mentioned above, in many cases, housings are made in two parts, namely a base and a semi-cylindrical cap which bolts down over the bearing holding it on the base.

The housing 60 of the present invention is of integral one-piece construction thereby avoiding the need for manufacturing two parts, and avoiding the use of bolts and the possibility of mismatching caps and bases.

The housing 60 consists of generally flat base portions 62 of rectangular shape in plan, provided with securing means such as bolt holes 64.

Formed integrally with the base portions 62, is a generally cylindrical sleeve-like portion 66, having a regular through-bore 68 extending therethrough, and the usual grease nipple 67. The through-bore 68 is sized to receive a bearing 12 of the appropriate dimensions.

Referring now to FIG. 6, it will be observed that the bore 68 has formed within it three or more spaced-apart parallel annular retention grooves 70, 72, and 74. The grooves are sized to receive retention means such as typical circlips 76 (FIG. 5).

The two grooves 70 and 72 are spaced apart a distance equal to the width of the bearing outer race for which the housing is designed. In this way, when the bearing is placed between them and two circlips are inserted in the two grooves 70 and 72, the bearing will be located in fixed position within the housing.

In certain cases, however, it is desirable that the bearing shall not be fixed against axial movement but shall be free to "float" axially, for example, in response to variations in the length of the shaft carried in the bearing, due to thermal conditions.

In this case, the two circlips are placed in the grooves 70 and 74. The groove 72 is not used.

This feature thereby avoids the need for spacer rings (not shown) which were formerly used in securing bearings in bearing housings.

A fourth groove indicated in phantom as 78 may be formed for still greater flexibility in use.

Shown in phantom at 80 is a line representing wear which sometimes occurs within the bearing housing. This arises due to stresses placed on the bearing during its life. These stresses gradually cause the bearing to form a shallow depression in part of the bearing housing. In the past, when bearings were provided conventionally with regular cylindrical surfaces on the exterior of the outer race, the bearing would then settle down into this recess. In this position, it was then no longer free to "float". The bearing was essentially locked in position in the recess that it had itself created. The condition of wear will still occur in certain circumstances using bearings in accordance with the present invention. However, in accordance with the present invention as described above, the outer cylindrical surface of the outer race is provided with a chamfer 22a or 10 degree lead at either end. When the bearing has worn the groove indicated as 80 into the bearing housing, and when it is subjected to axial stresses in response to which it should be free to float, the lead will permit the bearing to slide up out of the recess in which it is seated.

The invention is also applicable to other forms of bearing housing such as the flanged housing 82 (FIGS. 7, 8, and 9). Housing 82 has a flange 84 with holes 86 by which it may be fastened, and would also have a grease nipple (not shown).

Housing 82 is formed with spaced-apart arcuate shoulders 88. A bearing indicated generally as 12a is shown within the housing 82 being retained therein by retention devices 90.

As is shown in FIGS. 8 and 9, the housing 82 may be placed either on a flat surface, or alternatively may be placed in an opening O in such a surface. When located, as shown in FIG. 9, the blocks 88 will locate the bearing 82 within the opening O.

Fastening devices such as bolts B (FIG. 8) will be used to secure the housing 82 in position.

In order to provide facilities for greasing the bearing 12A, a grease nipple 92 may be positioned in a threaded recess 94, as shown in FIG. 8. In order to permit greasing when used in the configuration of FIG. 9 however a diagonal branch conduit 96 is provided by means of which access may be had to the grease passageways (not shown) within housing 82, when used in the FIG. 9 position.

As shown in FIG. 9, the grease nipple 92 will be located in a threaded recess communicating with the diagonal passageway 96.

A plug member 98 will close off the diagonal passageway in FIG. 8, and will close off the regular passageway 94 in FIG. 9.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A sealed double row spherical roller bearing, comprising:
   an outer race providing two spaced-apart outer roller tracks, and defining in section an arc of a sphere;
   an inner race defining two parallel spaced-apart inner roller tracks, each said inner track, in turn, defining in section an arc of a sphere;
   a plurality of rollers located in respective said inner and outer tracks, each of said rollers defining in section an arc of a sphere corresponding to said arcs of respective said inner and outer tracks;
   respective right angular seal retaining shoulders formed on respective ends of said outer race;
   respective seal engaging surfaces formed on respective ends of said inner race, and registering with said right angular shoulders;
   means defining two metallic lubricant reservoir rings, each of said reservoir rings defining in section an outer generally cylindrical wall portion received in respective right angular seal retaining shoulders on said outer race, and an annular closure wall portion extending from said outer cylindrical surface spaced apart from said rollers to define a lubricant reservoir, said outer wall portions and said closure wall portions being substantially normal to one another, and said rings further defining seal mounting portions angled relative to said closure wall portions and extending towards said rollers, said ring means defining generally asymmetrical channel-shaped recesses adjacent the edges of said outer race whereby to permit displacement of said rollers into said recesses in response to shaft misalignment, and, two annular flexible seal members mounted on respective said seal mounting portions, and extending into engagement with respective said seal engaging surfaces on said inner race.

2. A sealed double row spherical roller bearing as claimed in claim 1 and further including a bearing housing receiving said bearing, said housing being open at both ends whereby to permit removal of said bearing and insertion of said bearing at either end.

3. A sealed double row spherical roller bearing as claimed in claim 1, further comprising arcuate seal engaging surfaces formed on respective ends of said inner race and registering with said seal retaining means, said seal engaging surfaces being formed in section around an arc of a sphere whereby upon misalignment of said inner race, said seal members may move relative to said surfaces around and arcuate path minimizing flexing of said seal members relative to said reservoir rings.

4. A sealed double row spherical roller bearing as claimed in claim 3 and further including a bearing housing receiving said bearing, said housing being open at both ends whereby to permit removal of said bearing and insertion of said bearing at either end.

5. A sealed double row spherical roller bearing, comprising:

an outer race providing two spaced-apart roller tracks, and defining in section an arc of a sphere, and the outer surface of the outer race being generally cylindrical;

a bevelled lead portion formed along a marginal area of each end of said cylindrical surface, adjacent each end of said outer race;

an inner race defining two parallel spaced-apart inner roller tracks, each said inner track, in turn, defining in section an arc of a sphere;

a plurality of rollers located in respective said inner and outer tracks, each of said rollers defining in section an arc of a sphere corresponding to said arcs of respective said inner and outer tracks;

seal retaining means formed on respective ends of said outer race;

seal engaging faces formed on respective ends of said inner race;

seal holder rings, each engaged by said seal retaining means, and, two annular flexible seal members mounted on respective said rings, and extending into engagement with respective said seal engaging surfaces on said inner race.

6. A sealed double row spherical roller bearing as claimed in claim 5 and further including a bearing housing receiving said bearing, said housing being open at both ends whereby to permit removal of said bearing and insertion of said bearing at either end.

7. A sealed double row spherical roller bearing as claimed in claim 6, wherein said bearing housing defines a cylindrical through-bore through said housing for receiving said bearing and retention means at each end thereof for retaining said bearing.

8. A sealed double row spherical roller bearing, comprising:

an outer race providing two spaced-apart outer roller tracks, and defining in section an arc of a sphere;

an inner race defining two parallel spaced-apart inner roller tracks, each said inner track, in turn, defining in section an arc of a sphere;

a plurality of rollers located in respective said inner and outer tracks, each of said rollers defining in section an arc of a sphere corresponding to said arcs of respective said inner and outer tracks;

seal retaining means formed on respective ends of said outer race;

seal engaging faces formed on respective ends of said inner race;

two seal holder rings, each of said rings engaged by respective said seal retaining means, and, two annular flexible seal members mounted on respective said rings, and extending into engagement with respective said seal engaging surfaces on said inner race, each said seal member being adapted to flex outwardly with respect to said bearing, whereby to permit release of surplus lubricant, annular springs encircling respective seal members.

9. A sealed double row spherical roller bearing as claimed in claim 8 and further including a bearing housing receiving said bearing, said housing being open at both ends whereby to permit removal of said bearing and insertion of said bearing at either end.

10. A sealed double row spherical roller bearing as claimed in claims 2 or 4, wherein said bearing housing defines a cylindrical through-bore through said housing for receiving said bearing and retention means at each end thereof for retaining said bearing.

* * * * *